July 21, 1931.   J. R. COLE   1,815,036

STUFFING BOX AND PACKING THEREFOR

Filed May 15, 1930

James R Cole
INVENTOR

Patented July 21, 1931

1,815,036

UNITED STATES PATENT OFFICE

JAMES R. COLE, OF TULSA COUNTY, OKLAHOMA

STUFFING BOX AND PACKING THEREFOR

Application filed May 15, 1930. Serial No. 452,602.

My invention relates to stuffing boxes, primarily for oil wells but capable of other uses, and has for its object to provide a box easily packed and in which the packing can be entirely used up and in which replacement of packing is easily and quickly made, and also an improved form of packing element particularly adapted to this form of stuffing box. No wrench or other tool is needed to replace packing in the box, and this feature is particularly convenient in stuffing boxes for oil wells.

With the above and other objects in view which will appear as the description proceeds, my invention consists in the novel features hereinafter set forth in detail, illustrated in the accompanying drawings, and more particularly pointed out in the appended claims.

Referring to the drawings in which numerals of like character designate similar parts thruout the several views.

Figure 2:
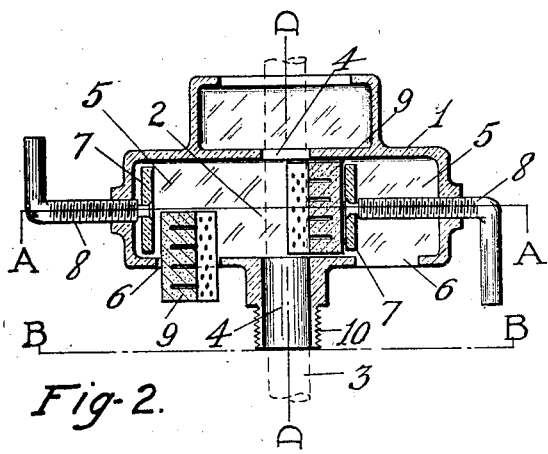
Fig. 2 is a cross sectional view of said box with one rubber in place and the other rubber partially inserted into the box, on line C—C of Fig. 1.
Figure 1:
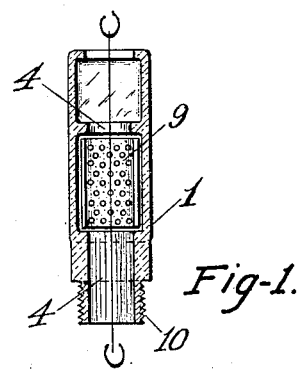
Fig. 1 is a cross sectional view of said box with a rubber in place, on line D—D of Fig. 2.
Figure 3:
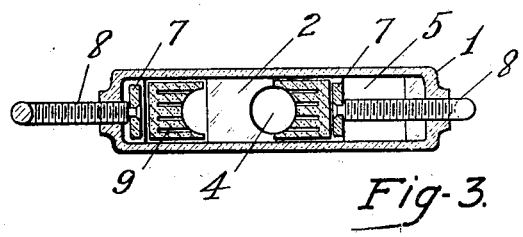
Fig. 3 is a top plan sectional view of said box and rubbers on line A—A of Fig. 2.
Figure 4:
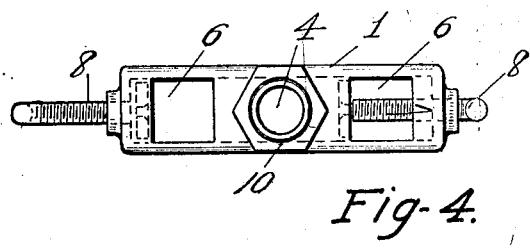
Fig. 4 is a view on line B—B of Fig. 2, of the bottom of said box in elevation.
Figure 5:
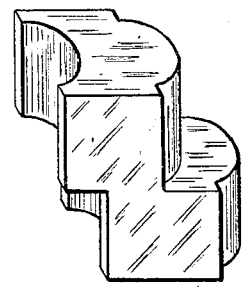

Fig. 5 is a view in perspective of a modified form of the packing element, referred to as a rubber, and differing from the rubbers shown in the box in that the top portion thereof is made to offset the bottom portion thereof with a view of using a rubber in that or similar offset form in a stuffing box of the character described, to make the same positively leak proof during that time when one rubber is following another rubber into position where the first rubber is partially worn thru by the polished rod and the second rubber is also in contact with the polished rod or piston. With this form of rubber there is no direct line open from top to bottom at the time the two rubbers are in contact with the polished rod as aforesaid, as would be the case if an offset is not made. If a rubber of the form shown in the box was used, the second or following rubber would have to be of the form shown in my patent application filed under date of April 16, 1930, and pending under Serial No. 444,697, with a flat face to contact with the flat rear surface of the first rubber. The form of rubber herein mentioned is not only adapted to be used in a breach loading stuffing box as shown herein and in the application just referred to, but is also adapted to be used in any kind of stuffing box wherein two rubbers opposed to each other and positioned on opposite sides of the polished rod, are used.

In the drawings, 1 represents the body portion of the box generally, showing the packing chamber 2 therein, and with the polished rod 3 indicated in outline, said polished rod passing thru said box thru apertures 4. The rear part of the chamber, said part being indicated by 5, is properly no part of the packing chamber proper as its only function is to permit the packing to be inserted thru a port 6 in front of the means of compressing the packing in the box, which said means consist of the follower 7 pivotally attached to a compression screw 8 threaded into the body portion of the box and against which the compression on the rubber reacts. 9 represents the packing element or rubber.

In operation the box is attached to the well tubing, if placed on an oil well, or attached to any chamber holding the fluid against which it is desired to pack off the polished rod, by threaded connection 10. The followers 7 are screwed back beyond the port 6, providing a clear passage for the insertion of the rubber into the rear portion of the box and in front of the follower 7. The rubber is then inserted and when in line with the packing chamber proper, designated at 2 it is then pressed into the packing chamber. By packing chamber is meant that part of the chamber near the polished rod and which is surrounded on all sides by the chamber wall against which together with the polished rod, the packing is compressed by compressing the follower 7 against the rubber 9 by means of the screw 8.

When new, that is additional, packing is to be placed in the chamber, the old packing need not be removed therefrom but the follower 7 is backed away to permit the new rubber to be inserted behind the rubber, or what is left of it, remaining in the box and already in place against the polished rod. As previously stated these second rubbers may be square and with a flat face instead of having a groove therein for the polished rod, or all rubbers may have said groove in front and may be contoured correspondingly in the rear, so that one fits into the other as explained in the prior patent application aforesaid. In the latter case, the face of the follower should of course be likewise contoured. However, where rubbers in the offset form as shown in Fig. 5 are used, it is obvious that the first rubber inserted must not bear the offset in front, or if such a rubber is used an additional block of rubber bearing the polished rod groove, must be inserted to fill out the offset in the rubber.

To facilitate the explanation, I will refer to a stuffing box such as described as being a breech loading stuffing box, wherein the packing is inserted into the packing chamber of said box thru its breach, and designate the breach as being the opening of the packing chamber proper located at the rear of the packing chamber, or end thereof away from the polished rod, it being a fact that the packing element is inserted at the rear, thru the breech, and comes out, being worn away, at the polished rod which would correspondingly be termed the muzzle of the box. The port 6 then is more clearly understood as being simply a means for getting the packing element to the breech of the box and in a position ahead of the follower 7 thru which the packing is compressed with the screw 8, and moreover that the port 6 need not necessarily be a port, but the screw 8 could be held in a frame to the rear of the breech at a distance therefrom so that the rubber could be inserted in the breech ahead of the follower, and the same result would be accomplished. It is further evident that if a port is used to provide the opening thru which the rubber may reach the breech of the stuffing box, that the port could be on the side or on top as well as on the bottom as shown. However, it is preferred to place the port at the bottom and to enclose the rear portion of the chamber indicated at 5 as a means whereby dirt and foreign articles may be kept out of the box so that its operation will not be impeded or interfered with.

Having thus fully disclosed my invention of a breech loading stuffing box designed as shown and of a rubber specifically adapted to be used in a breech loading box of the character described, what I claim and desire to secure by Letters Patent is:

1. A breech loading stuffing box wherein a plurality of packing elements are used opposed to each other on opposite sides of a polished rod passed thru said box, and with said stuffing box having a packing chamber adapted to pass a polished rod therethru, and with said packing chamber being a closure wherein said packing elements may be compressed against the perimeter thereof and against a polished rod passed thru said chamber, and with said packing chamber having a breech at opposite ends thereof thru which packing may be inserted into said packing chamber; means of compressing said packing in said packing chamber and against a polished rod passed therethru wherein said means consist of a follower actuated by a compression screw to the rear thereof, and a compression screw as aforesaid threaded into a permanently affixed part of the body portion of said stuffing box, and a port in the under side of said body portion of said stuffing box and communicating with said packing chamber and adapted for the insertion of packing therethru.

2. A packing element adapted for use in a stuffing box of the character described herein; and with said packing element being in form provided with front and rear offset portions and corresponding front and rear recesses, to the effect that one portion of the packing element may overlap a portion of another similarly formed packing element when both of said packing elements are in operation.

In testimony whereof I affix my signature.

JAMES R. COLE.